(12) United States Patent
Luong et al.

(10) Patent No.: US 8,156,898 B2
(45) Date of Patent: Apr. 17, 2012

(54) METHOD AND APPARATUS FOR ACCLIMATING AQUATIC ORGANISMS TO A NEW ENVIRONMENT

(76) Inventors: Le Quan Luong, San Jose, CA (US); Wai C. Chu, San Jose, CA (US)

( * ) Notice: Subject to any disclaimer, the term of this patent is extended or adjusted under 35 U.S.C. 154(b) by 673 days.

(21) Appl. No.: 12/275,130

(22) Filed: Nov. 20, 2008

(65) Prior Publication Data
US 2009/0139457 A1    Jun. 4, 2009

Related U.S. Application Data

(60) Provisional application No. 61/004,685, filed on Nov. 29, 2007.

(51) Int. Cl.
*A01K 63/02* (2006.01)
(52) U.S. Cl. .................................. 119/251
(58) Field of Classification Search .............. 119/251, 119/216, 248, 203, 201, 200; D30/106
See application file for complete search history.

(56) References Cited

U.S. PATENT DOCUMENTS

| | | | |
|---|---|---|---|
| D214,918 S * | 8/1969 | Willinger | D30/106 |
| 3,491,722 A | 1/1970 | Levitov et al. | |
| 3,826,371 A * | 7/1974 | Adamson | 210/167.21 |
| 3,958,393 A | 5/1976 | Whitener | |
| 4,188,909 A | 2/1980 | Spivak | |
| 4,622,148 A * | 11/1986 | Willinger | 210/615 |
| D304,506 S * | 11/1989 | Tominaga | D30/106 |
| 6,591,783 B1 | 7/2003 | Lajeunesse | |
| 6,640,749 B1 | 11/2003 | Monnier | |
| 7,114,460 B2 * | 10/2006 | Amblard | 119/203 |
| 2007/0227459 A1 | 10/2007 | Gould | |

OTHER PUBLICATIONS

John Dawes, Fish Care in the Aquarium, Complete Encyclopedia of the Freshwater Aquarium, p. 50-51, Firefly Books Inc, 2001, Ontario Canada.
Vincent Hargreaves, Introducing fishes to an aquarium, The Complete Book of the Marine Aquarium, p. 59, Thunder Bay Press, 2006, San Diego California.

* cited by examiner

*Primary Examiner* — Kristen C Hayes
(74) *Attorney, Agent, or Firm* — Schneck & Schneck; David Schneck

(57) ABSTRACT

An apparatus for acclimating an aquatic organism, contained in a partially water filled plastic bag, to an environment in an aquarium includes an aquarium frame comprising a first portion exterior to the aquarium and a second portion interior to the aquarium. A bag holder is operable to hold a top of the plastic bag in an open position. The bag holder is positioned on the second portion where the top of the plastic bag is above a top level of water in the aquarium and a substantial portion of the plastic bag is below the top level. A dripping cup is operable to release water obtained from the aquarium into the plastic bag. The dripping cup is joinable to the first portion, whereby the aquatic organism is acclimated to a chemistry and temperature of the water in the aquarium.

8 Claims, 13 Drawing Sheets

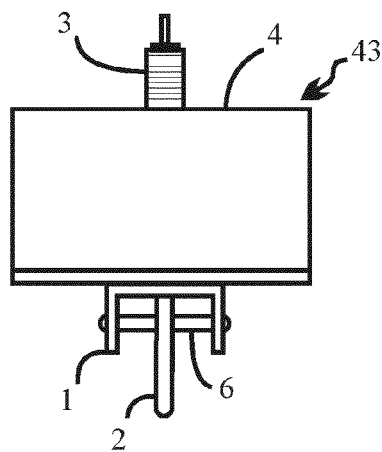
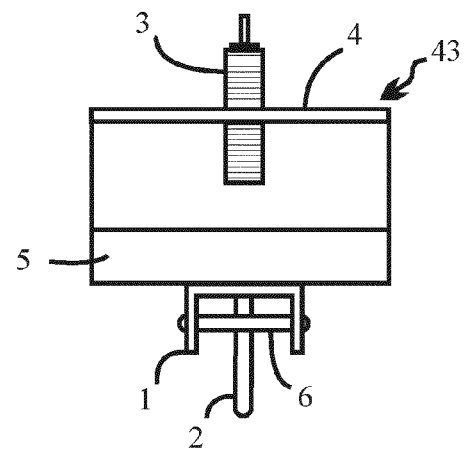
FIG. 1c  FIG. 1d
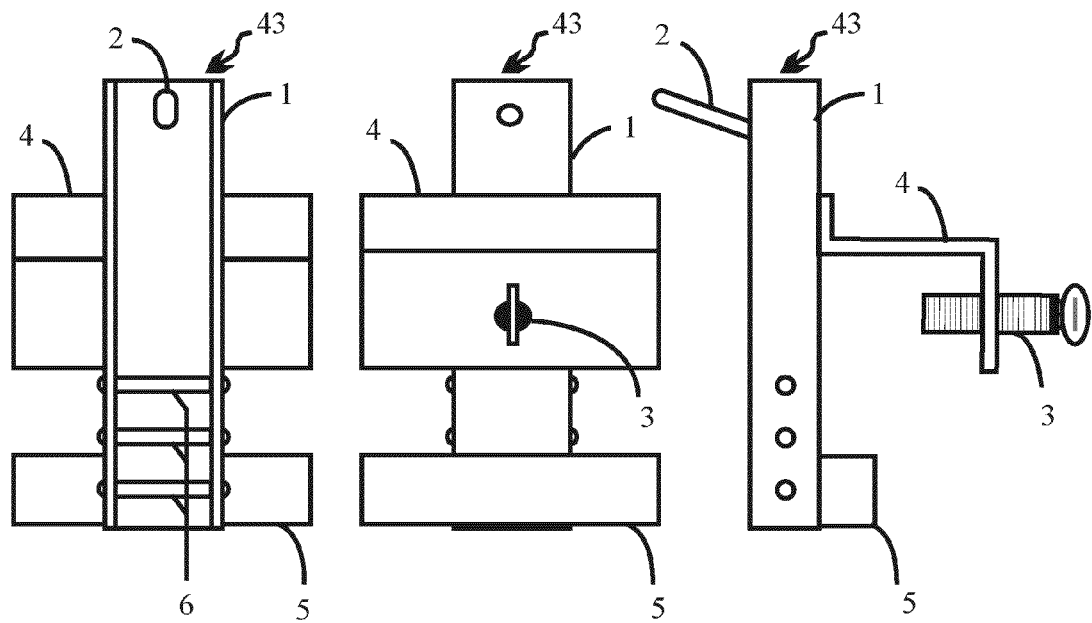
FIG. 1e  FIG. 1f  FIG. 1g

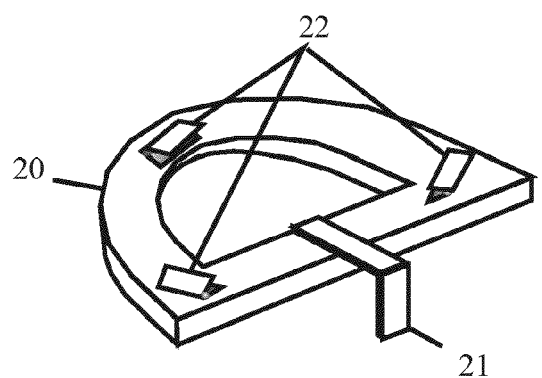
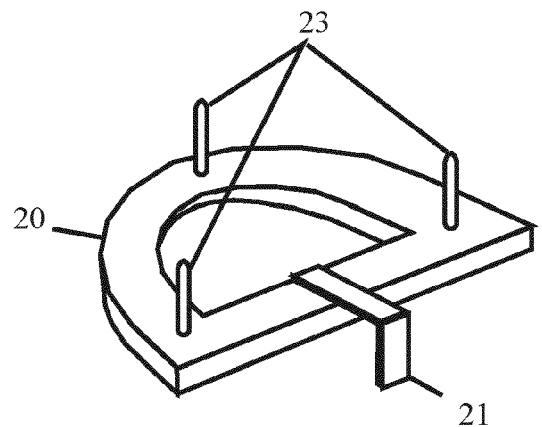
FIG. 3a    FIG. 3b
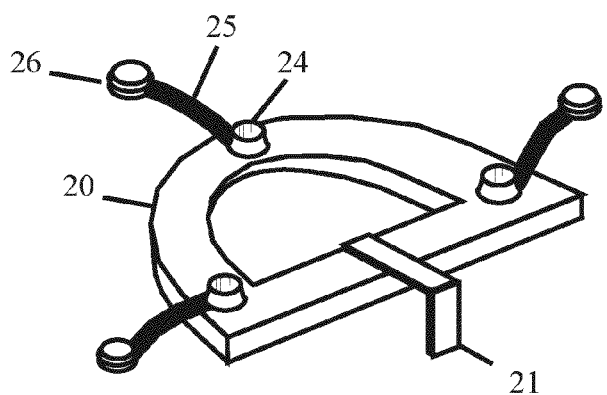
FIG. 3c

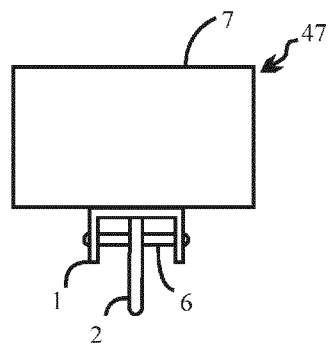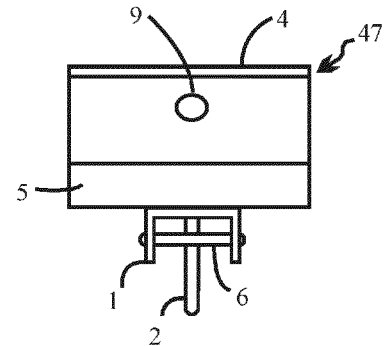
FIG. 8c  FIG. 8d
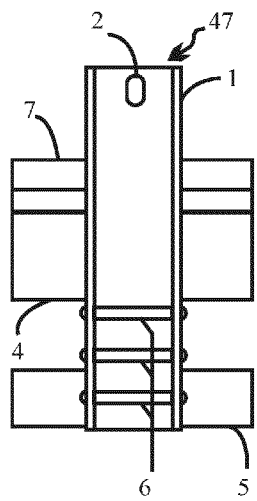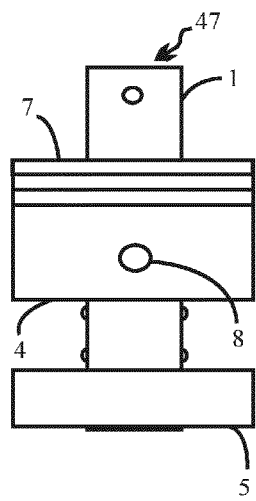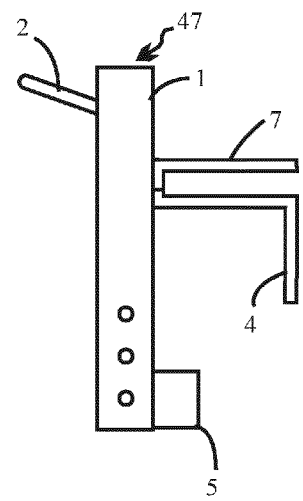
FIG. 8e  FIG. 8f  FIG. 8g

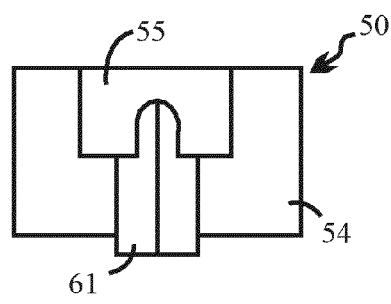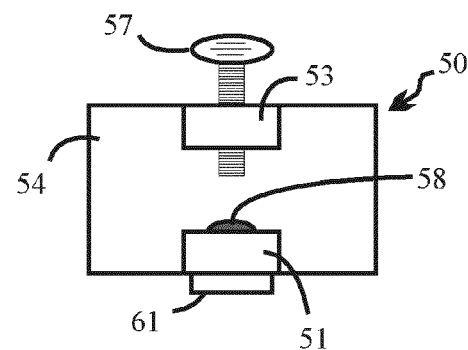
FIG. 10c  FIG. 10d
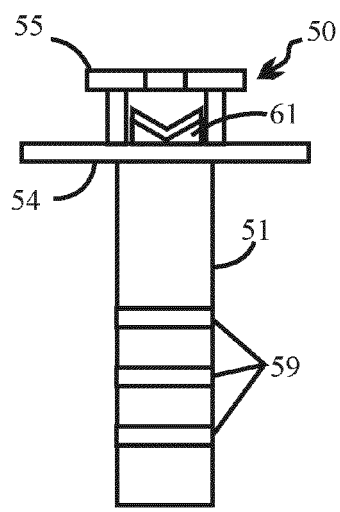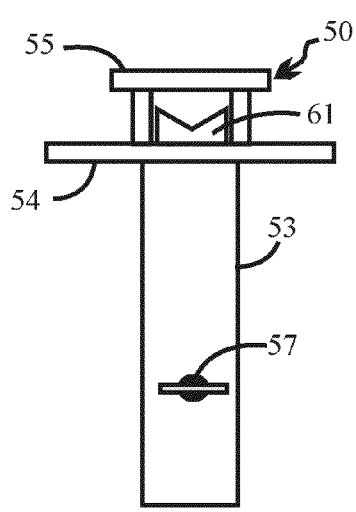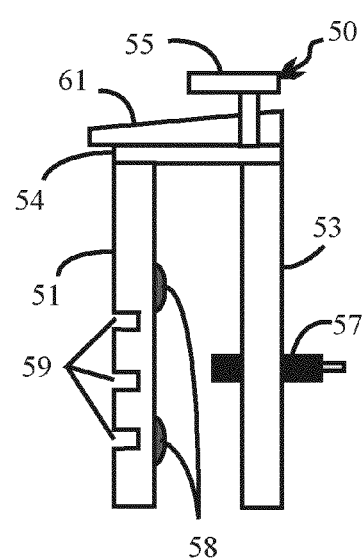
FIG. 10e  FIG. 10f  FIG. 10g

METHOD AND APPARATUS FOR ACCLIMATING AQUATIC ORGANISMS TO A NEW ENVIRONMENT

CROSS-REFERENCE TO RELATED APPLICATIONS

The present Utility patent application claims priority benefit of the U.S. provisional application for patent Ser. No. 61/004,685 filed on Nov. 29, 2007 under 35 U.S.C. 119(e). The contents of this related provisional application are incorporated herein by reference for all purposes.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates generally to aquariums. More particularly, the invention relates to a method and means for acclimating aquatic organisms to a new environment.

BACKGROUND OF THE INVENTION

The present invention relates to an apparatus to perform acclimation for aquatic organisms including, but not limited to, fish, invertebrates (e.g., crabs, shrimps, sea stars, etc.), and plants. It is assumed that the live specimens are typically transported using plastic bags filled with water, which is a technique popularly used by pet stores and aquatic animal trades. Furthermore, it is assumed that the live specimens are intended to live in an aquarium, normally as pets. Upon arrival to the target aquarium, an acclimation process is necessary to gradually change the water conditions inside the bag to that of the target aquarium. The live specimen is released into its new habitat only when the conditions inside the bag are sufficiently close to that of the target aquarium. This process is necessary because aquatic animals, such as, but not limited to, fish or invertebrates, are extremely sensitive to the condition of their liquid environment; these conditions include temperature, salinity, ph, and other chemical composition. A sudden change in any of these conditions may result in shock, which frequently causes disease or death to the animal. In order to produce a successful introduction, it is necessary to acclimate the aquatic inhabitant to its new environment with as little trauma as possible.

The traditional method of acclimation for aquatic animals has been to float the plastic bag containing the animals in the target aquarium and to manually add a small amount of water from the target aquarium into the bag at some fixed interval of time, for example, every 5 minutes. Due to thermal transmission through the bag, the water temperature inside the bag gradually changes toward that of the target aquarium; also, the slow introduction of water from the target aquarium into the bag produces a gradual change of water conditions. The process as described, however, is tedious and error-prone since a human must supervise and manually execute the procedure for an extended period of time, typically more than twenty minutes.

The present invention addresses many of the disadvantages of the prior art by providing an apparatus that is simple and cost-effective for the purpose of acclimation. Prior art offers various techniques and means to perform acclimation, described as follows.

In some prior art acclimation systems, a tank that can be attached to an aquarium is proposed together with means to control the flow rate of water into the tank. The main disadvantage of the designs is that the water used to transport the aquatic animal might not be enough to fill the tank to a proper level. Furthermore, the fact that the aquatic animal must be poured into the empty tank to start the acclimation process creates additional stress for the animal. Finally, different animal sizes require different tank sizes, and a fixed tank cannot handle a variety of animals having different sizes and volume requirements.

In another prior art acclimation system, a complete system for packaging, transporting, and acclimation is described, and is based on sealing the live specimen in a container. For acclimation, holes are punctured in the container, and water from the target aquarium is introduced through the use of plastic tubes. Since water must exit the container, additional setup must be provided to collect the water. The system is more suitable for large-scale commercial applications, since sealed containers are not commonly used by pet stores and animal trades at the consumer level.

In another prior art acclimation system, a packaging and acclimation system is described that is also based on a sealed container. For acclimation, holes are punctured in the container, which is then allowed to sink into the target aquarium. The holes permit a gradual water exchange between the aquarium and the container. While the design achieves acclimation automatically, the water flow rate cannot be easily controlled. Moreover, it is not possible to maintain the water in the aquarium separate from the transportation water, as is desired by many aquarists.

In yet another prior art acclimation system, a special plastic bag design for fish packaging and transportation is described. The design allows the bag to float while staying open at the aquarium, hence achieving gradual temperature equalization. To dilute the content inside the bag, manual water addition is necessary. While the design is generally sound, the need to manually pour water to the bag is tedious. Additionally, a floating bag that is free to move has problems with aquariums that have strong water flow, such as those having fountains or other filtration systems; the water movement at the aquarium may sink the bag or cause unintended water exchange. Finally, the specially designed bag is more expensive than the plain bag used by most pet stores, hence the business cost is raised, leading to resistance in its adoption.

In yet another prior art acclimation system, a fish acclimation siphon device is described, where the fish to be acclimated together with the transportation water are poured into a container, and water from the target aquarium is brought in using a hose. Although the design is simple, the initial pouring of the fish into an empty container is highly stressful to the fish itself, and the amount of transportation water may not be sufficient to provide an adequate level in the container. Furthermore, because the container is not submerged into the aquarium, the water temperature in said container and the water temperature in said aquarium may not equalize, even though the water in said container is diluted by the water in said aquarium, due to the fact that the dilution process is slow. The prior art system described here is currently available for consumer purchase at various pet supply outlets such as www.drfostersmith.com.

In view of the foregoing, there is a need for improved techniques for providing means for acclimating aquatic organisms to a new environment that is easy to use and cost effective.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 1a through 1g illustrate an exemplary aquarium frame for an aquatic life acclimation system, according to an embodiment of the present invention. FIG. 1a is a front perspective view, and FIG. 1b is a rear perspective view. FIG. 1c is a top view. FIG. 1d is a bottom view. FIG. 1e is a front view. FIG. 1f is a rear view, and FIG. 1g is a side view;

FIGS. 3a, 3b and 3c are perspective views of an exemplary bag holder for an aquatic life acclimation system with three different bag attachment means, in accordance with an embodiment of the present invention. FIG. 3a comprises clips, FIG. 3b comprises rods, and FIG. 3d comprises cap devices;

FIG. 4a illustrates a fish stored in a closed plastic bag for transport. FIG. 4b illustrates the bag in an open position, ready to be attached to a bag holder frame. FIG. 4c illustrates the attachment of the bag to the bag holder frame, and FIG. 4d illustrates the bag attached to the bag holder frame;

FIGS. 8a through 8g illustrate an exemplary aquarium frame that may be used with both narrow-edge and wide-edge aquariums, in accordance with an embodiment of the present invention. FIG. 8a is a front perspective view, and FIG. 8b is a rear perspective view. FIG. 8c is a top view. FIG. 8d is a bottom view. FIG. 8e is a front view. FIG. 8f is a rear view, and FIG. 8g is a side view;

FIG. 9a shows the aquarium frame attached to a narrow-edge aquarium, and FIG. 9b shows the aquarium frame attached to a wide-edge aquarium.

FIGS. 10a through 10g illustrate an exemplary aquarium frame for an aquatic life acclimation system, in accordance with an embodiment of the present invention. FIG. 10a is a front perspective view, and FIG. 10b is a rear perspective view. FIG. 10c is a top view. FIG. 10d is a bottom view. FIG. 10e is a front view. FIG. 10f is a rear view, and FIG. 10g is a side view.

Figure 1A:
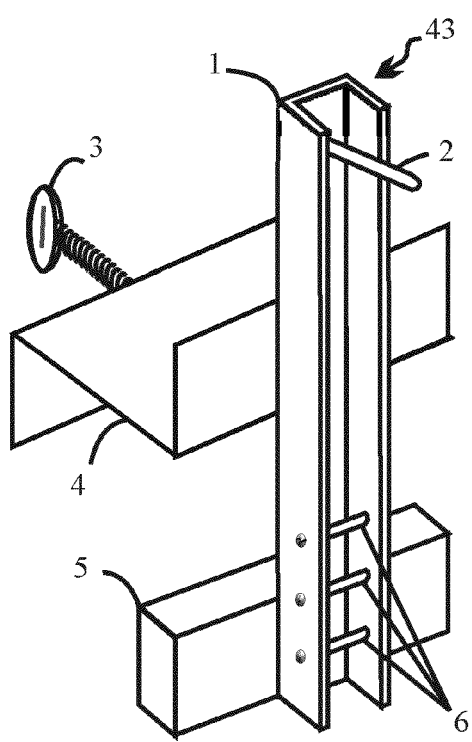

Unless otherwise indicated illustrations in the figures are not necessarily drawn to scale.

SUMMARY OF THE INVENTION

To achieve the forgoing and other objects and in accordance with the purpose of the invention, a method and apparatus for acclimating aquatic organisms to a new environment is presented.

In one embodiment, an apparatus for acclimating an aquatic organism, contained in a partially water filled plastic bag, to an environment in an aquarium is presented. The apparatus includes an aquarium frame comprising a first portion exterior to the aquarium and a second portion interior to the aquarium. A bag holder is operable to hold a top of the plastic bag in an open position. The bag holder is positioned on the second portion where the top of the plastic bag is above a top level of water in the aquarium and a substantial portion of the plastic bag is below the top level. A dripping cup is operable to release water obtained from the aquarium into the plastic bag. The dripping cup is joinable to the first portion, whereby the aquatic organism is acclimated to a chemistry and temperature of the water in the aquarium. In other embodiments the second portion further includes a plurality of positions upon which the bag holder can be positioned and the plurality of positions includes pins and the bag holder further includes a hook for engaging the pins. In another embodiment the first portion further includes a dripping cup holder for removably joining the dripping cup. In still other embodiments the bag holder further includes a center orifice into which the top of the plastic bag can pass through and the bag holder further includes clips for holding the top of the plastic bag in the open position. In yet other embodiments the first portion further includes a hook for engaging the aquarium and tightening means for adjusting and securing the apparatus to the aquarium and the second portion further includes pad means for contacting an interior surface of the aquarium to provide stability to the apparatus. In another embodiment the first portion further includes an upper extension for joining to a wide top edge of the aquarium. In still another embodiment the dripping cup further includes a valve for initiating a flow of water into the bag and adjusting a rate of the flow. In yet other embodiments the first portion further includes a trough for directing a flow of water from the dripping cup to the bag and the first portion further includes a platform for holding the dripping cup.

In another embodiment an apparatus for acclimating an aquatic organism, contained in a partially water filled plastic bag, to an environment in an aquarium is presented. The apparatus includes means for holding a top of the plastic bag in an open position, means for securing the holding means interior to the aquarium where the top of the plastic bag is above a top level of water in the aquarium and a substantial portion of the plastic bag is below the top level and means for releasing water obtained from the aquarium into the plastic bag, whereby the aquatic organism is acclimated to a chemistry and temperature of the water in the aquarium. Other various embodiments further include means for adjusting and securing the apparatus to the aquarium and means for contacting an interior surface of the aquarium to provide stability to the apparatus. Yet another embodiment further includes means for joining to a wide top edge of the aquarium. Still another embodiment further includes means for directing a flow of water from the dripping cup to the bag.

In another embodiment a method for acclimating an aquatic organism, contained in a partially water filled plastic bag, to an environment in an aquarium is presented. The method includes steps of joining an aquarium frame to an edge of the aquarium with a first portion exterior to the aquarium and a second portion interior to the aquarium, holding a top of the plastic bag in an open position with a bag holder, positioning the bag holder on the second portion where the top of the plastic bag is above a top level of water in the aquarium and a substantial portion of the plastic bag is below the top level, obtaining water from the aquarium in a dripping cup and joining the dripping cup to the first portion where water released from the dripping cup flows into the plastic bag, whereby the aquatic organism is acclimated to a chemistry and temperature of the water in the aquarium. Another embodiment further includes steps of adjusting and securing the aquarium frame to the aquarium. Yet another embodiment further includes steps of initiating a flow of water from the dripping cup into the bag and adjusting a rate of the flow.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention will now be described in detail with reference to embodiments thereof as illustrated in the accompanying drawings.

Preferred embodiments of the present invention provide an apparatus that is simple and cost-effective for the automatic acclimation of aquarium fishes and aquatic organisms. The target users of this apparatus are aquarium hobbyists or biological researchers that routinely introduce aquatic animals to new habitats. Preferred embodiments allow for the use of typical pet store plastic bags containing the live specimen to be acclimatized. When using preferred embodiments, the plastic bag is placed in a target aquarium to enable the water in the bag to slowly reach the same temperature of the target aquarium, and water from the target aquarium may be automatically introduced into the bag to slowly change the water conditions in the bag to match those of the target aquarium.

A preferred embodiment of the present invention comprises an aquarium frame, a dripping cup, and a bag holder. The aquarium frame may be attached to a target aquarium during acclimation, and provides support for the other components. The bag holder holds the plastic bag containing the live specimen in place for acclimation, while keeping the bag opened so as to allow water to be introduced into the bag. The dripping cup holds water from the target aquarium, and the collected water is allowed to drip from the dripping cup and is guided toward the opening of the bag holder during the acclimation process, diluting the content of the plastic bag that is being held by the bag holder.

Advantages of preferred embodiments of the present invention include, without limitation, the ability to fully automate the acclimation process, and to provide a simple, cost-effective solution to many aquarists. Preferred embodiments enable the use of the plastic bag used for transport for the acclimation process, which is highly desirable since it is the most popular method of transportation used by pet stores and aquatic animal trades. Moreover, the water in which the live specimen has been transported need not be poured into the target aquarium, therefore avoiding cross contamination.

Figure 1B:
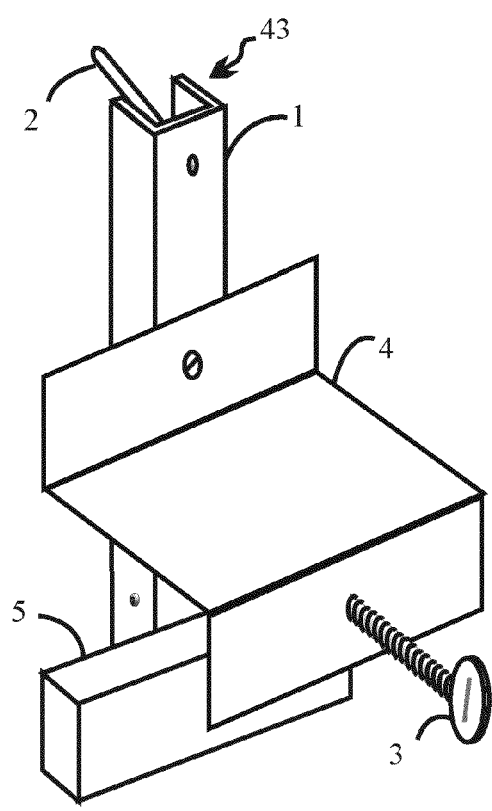

FIGS. 1a through 1g illustrate an exemplary aquarium frame 43 for an aquatic life acclimation system, according to an embodiment of the present invention. FIG. 1a is a front perspective view, and FIG. 1b is a rear perspective view. FIG. 1c is a top view. FIG. 1d is a bottom view. FIG. 1e is a front view. FIG. 1f is a rear view, and FIG. 1g is a side view. In the present embodiment, aquarium frame 43 is designed to be attached to the edge of an aquarium with a hook 4, which is fixed to a column 1. On one side of hook 4, a tightening screw 3 is provided, which enables the position of aquarium frame 43 to be adjusted as required by different aquariums having different dimensions. In the present embodiment, column 1 is u-shaped and provides support for other elements, including, but not limited to, a dripping cup holder 2, a plurality of rods 6, and a pad 5. A dripping cup may be attached to dripping cup holder 2. Dripping cup holder 2 holds the dripping cup still with respect to column 1 during the acclimation process. A bag holder can be placed at one of the positions given by rods 6. A plurality of rods 6 are provided to enable the bag holder to be held in different positions, depending on the water level of the aquarium. In alternate embodiments, various different means for holding the bag holder may be provided including, without limitation, grooves, holes for pegs, screws, etc. In the present embodiment, pad 5 provides stability for the aquarium frame, which remains in contact with the wall of the aquarium during the acclimation process. Alternate embodiments may include more or fewer pads, and the pads may be of various different shapes and sizes. In other alternate embodiments suction cups may be used rather than pads.

Figure 2:
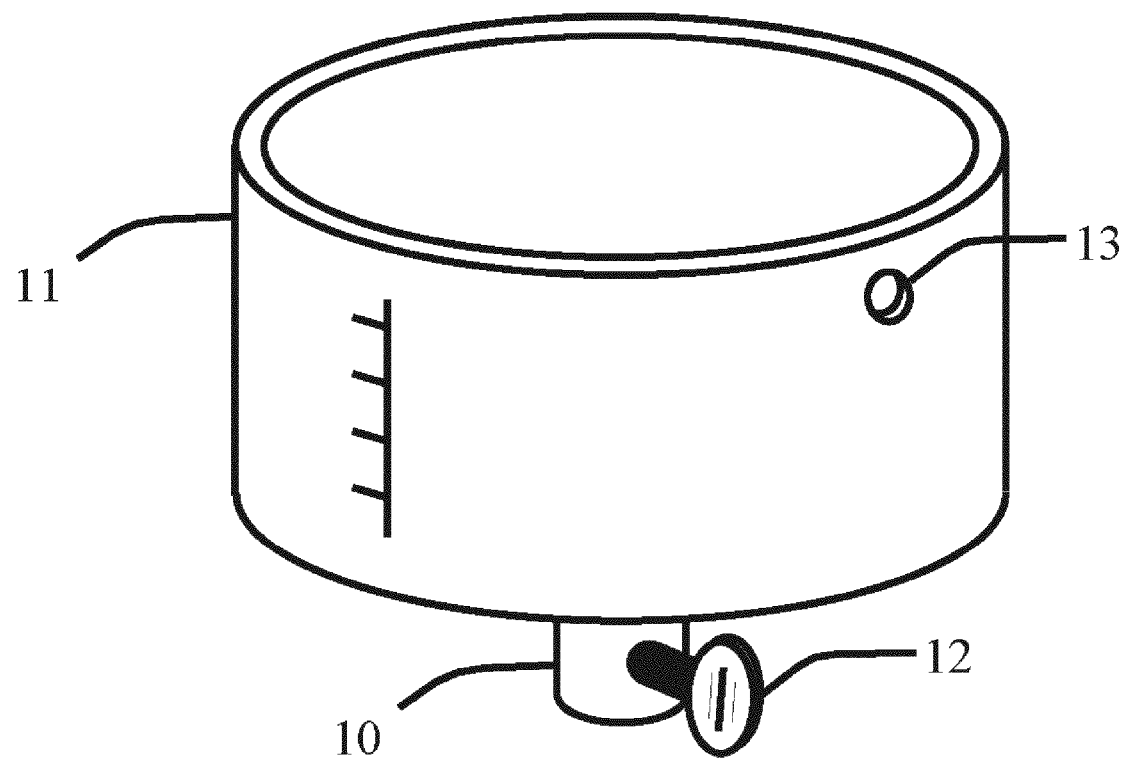
FIG. 2 is a perspective view of an exemplary dripping cup for an aquatic life acclimation system, in accordance with an embodiment of the present invention.

FIG. 2 is a perspective view of an exemplary dripping cup for an aquatic life acclimation system, in accordance with an embodiment of the present invention. In the present embodiment the dripping cup comprises a cup 11, a valve 10, a valve handle 12, and a hole 13. Water poured into cup 11 flows out of cup 11 through valve 10. Valve handle 12 controls the flow rate of the water through valve 10. During the acclimation process, the dripping cup filled with water is supported by the aquarium frame. In the present embodiment, the dripping cup is attached to the aquarium frame by inserting a dripping cup holder, for example, without limitation, dripping cup holder 2, shown by way of example in FIGS. 1a, 1b, 1c, 1d, 1e, and 1g into hole 13 of the dripping cup. In alternate embodiments, the dripping cup may be attached to the aquarium frame using various different means such as, but not limited to, hooks, screws, hook and loop means, and various fixture designs. In the present embodiment, cup 11 is cylindrical in shape. However, cups in alternate embodiments may be shaped differently; for example, without limitation, cups may be square, rectangular, spherical, or funnel shaped.

FIGS. 3a, 3b and 3c are perspective views of an exemplary bag holder for an aquatic life acclimation system with three different bag attachment means, in accordance with an embodiment of the present invention. FIG. 3a comprises clips 22, FIG. 3b comprises rods 23, and FIG. 3d comprises cap devices. In the present embodiment the bag holder comprises a frame 20 and a hook 21. Frame 20 has a center orifice into which a plastic bag may pass through. Hook 21 is fixed to frame 20 and enables the bag holder to be positioned on a rod on an aquarium frame, for example, without limitation, one of rods 6 on the aquarium frame shown by way of example in FIGS. 1a, 1c, 1d, and 1e. In alternate embodiments, the bag holder may comprise various different means for being attached to an aquarium frame such as, but not limited to, pegs that fit into holes in the aquarium frame, a slider that fits into a track, clips, screws, etc. In the present embodiment, frame 20 is semi-circular in shape; however, bag holder frames in alternate embodiments may have different shapes such as, but not limited to, circles, rectangles, etc. Referring to FIG. 3a, three clips 22 are fixed on frame 20. Clips 22 are used to grasp the border of a plastic bag so as to keep the bag opened and steady during the acclimation process. Referring to FIG. 3b, three rods 23 are fixed on frame 20 that retain the plastic bag while keeping the bag open. In this case some holes must be punctured in the plastic bag. Referring to FIG. 3c, a number of devices comprising a base 24, a flexible link 25, and a cap 26 are fixed on frame 20. In order to hold a plastic bag during the acclimation process, cap 26 is pressed against base 24 with the border of the plastic bag inserted between cap 26 and base 24. This action keeps cap 26 tight with respect to base 24, hence holding the plastic bag. Flexible link 25 keeps cap 26 attached to base 24. Those skilled in the art, in light of the present teachings, will readily recognize that the bag holder may comprise various different means for holding the bag such as, but not limited to, tacks, screws, spring loaded clips, magnetic devices, etc.

Figure 4A:
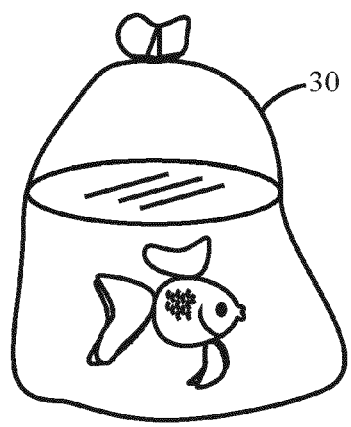
FIGS. 4a through 4d illustrate exemplary steps involved in attaching a specimen contained in a plastic bag to a bag holder frame for an aquatic life acclimation system, in accordance with an embodiment of the present invention.
Figure 4B:
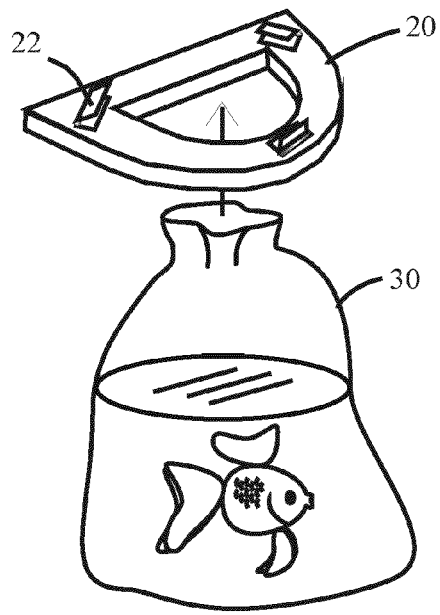
Figure 4C:
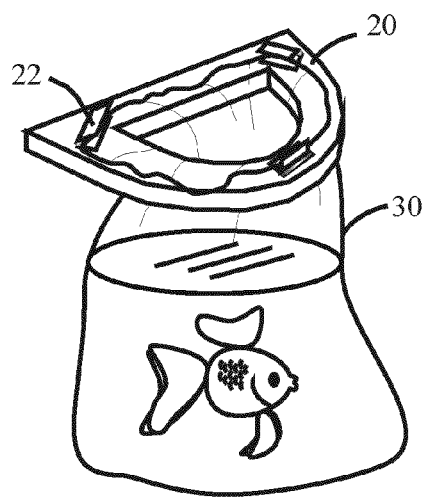
Figure 4D:
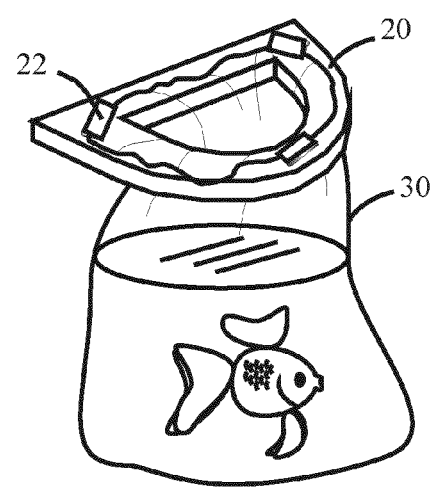

FIGS. 4a through 4d illustrate exemplary steps involved in attaching a specimen contained in a plastic bag 30 to a bag holder for an aquatic life acclimation system, in accordance with an embodiment of the present invention. FIG. 4a illustrates a fish stored in a closed plastic bag 30 for transport. FIG. 4b illustrates bag 30 in an open position, ready to be attached to a bag holder frame 20. FIG. 4c illustrates the attachment of bag 30 to bag holder frame 20, and FIG. 4d illustrates bag 30 attached to bag holder frame 20. Typically, a specimen is transported in a plastic bag 30 that is closed by rubber bands, as shown by way of example in FIG. 4a. Referring to FIG. 4b, upon arrival to its destination, bag 30 is opened. Clips 22 of bag holder frame 20 are opened so as to grasp the border of plastic bag 30. Referring to FIG. 4c, the opening of plastic bag 30 is passed through the center orifice of bag holder frame 20. Finally, referring to FIG. 4d, clips 22 are closed, and plastic bag 30 is attached to bag holder frame 20. In the present embodiment, bag 30 is removed from bag holder frame 20 by opening clips 22 and pulling bag 30 out of clips 22 and away from bag holder frame 20.

Figure 5:
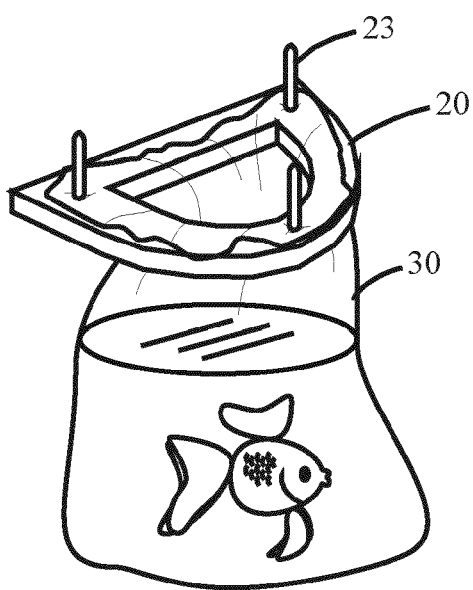
FIG. 5 illustrates a plastic bag being held by a bag holder frame with rods, in accordance with an embodiment of the present invention.

FIG. 5 illustrates a plastic bag 30 being held by a bag holder frame 20 with rods 23, in accordance with an embodiment of the present invention. In the present embodiment, holes are punctured in bag 30 allowing bag 30 to be held by rods 23 on frame 20. In the present embodiment, bag 30 is released from bag holder frame 20 by lifting bag 30 up and off of rods 23.

Figure 6:
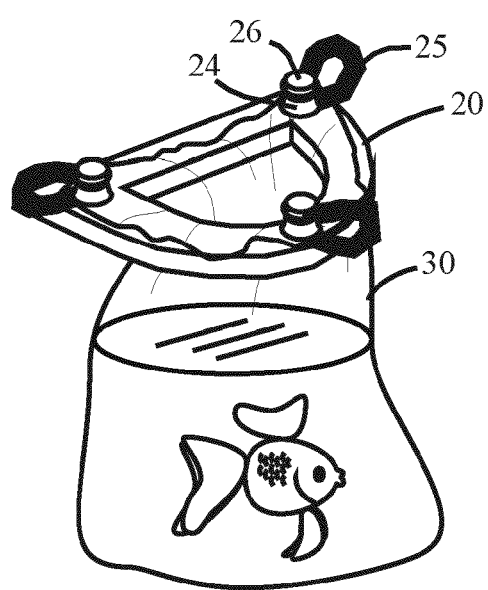
FIG. 6 illustrates a plastic bag being held by a bag holder frame with caps, in accordance with an embodiment of the present invention.

FIG. 6 illustrates a plastic bag 30 being held by a bag holder frame 20 with cap devices, in accordance with an embodiment of the present invention. In the present embodiment, bag 30 is held when caps 26 are pressed against bases 24 with the edge of bag 30 inserted between caps 26 and bases 24. In this embodiment bag 30 is released by separating caps 26 from bases 24.

Figure 7:
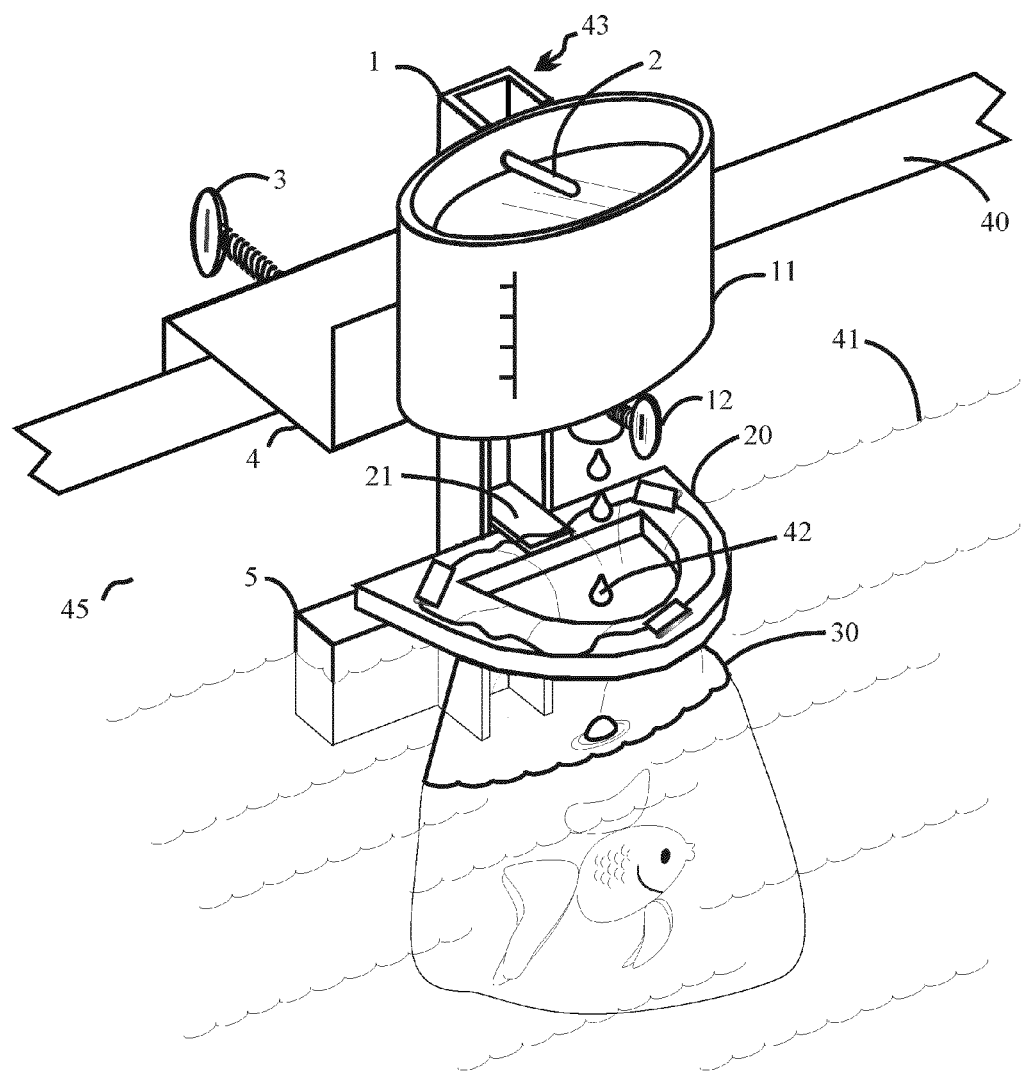
FIG. 7 illustrates an exemplary aquatic life acclimation system in use on an aquarium, in accordance with an embodiment of the present invention.

FIG. 7 illustrates an exemplary aquatic life acclimation system in use on an aquarium, in accordance with an embodiment of the present invention. In the present embodiment, a hook 4 on an aquarium frame 43 is placed on an edge 40 of an aquarium. In some embodiments the hook may have an adjustable length to accommodate aquariums of different sizes. In the present embodiment, a bag holder frame 20 holding a plastic bag 30 containing a specimen is attached to aquarium frame 43. In the present embodiment, bag holder frame 20 attaches to aquarium frame 43 where a hook 21 on bag holder frame is attached to a rod 6 on a column 1 of aquarium frame 43. Bag holder frame 20 is positioned so that it is above the surface of water 41 or the highest water level in the aquarium while a portion of attached plastic bag 30 is submerged in aquarium water 41. A pad 5 on column 1 of aquarium frame 43 is in contact with a wall 45 of the aquarium and provides stability to the entire apparatus. In some embodiments the pad may include a mechanism that enables the distance of the pad from the column to be adjusted. In the present embodiment, a tightening screw 3 is adjusted so that column 1 of aquarium frame 43 remains in a vertical position. A dripping cup 11 with water collected from the aquarium is attached to aquarium frame 43 with a dripping cup holder 2. Water drops 42 dripping from dripping cup 11 fall directly into plastic bag 30 being held by bag holder frame 20.

It is up to the user of the acclimation system to determine the time spent in the acclimation process. The user can abort the acclimation process anytime and release the specimen into the aquarium. If further acclimation is desired after plastic bag 30 is full, some water inside bag 30 can be removed and the acclimation process can be continued further. To release the specimen, the user may pour the entire contents of plastic bag 30 into the aquarium. However, if it is not desired to introduce the transportation water into the aquarium, the specimen can be collected through a net or a cup before being released into the aquarium. Because plastic bag 30 is partially submerged, a gradual temperature exchange with the host aquarium is achieved; furthermore water drops 42 from dripping cup 11 dilute the water in bag 30, hence a slow chemical equalization is developed. With the correct flow rate of water drops 42 into bag 30, the present embodiment is effective in achieving simultaneous temperature and chemical equalization between the contents of bag 30 and the host aquarium. The frequency of water drops 42 coming from dripping cup 11 can be controlled by adjusting a valve handle 12 of a valve 10 on dripping cup 11.

The previous embodiment for the aquarium frame works well for most aquariums where the edge is relatively narrow, for example, without limitation, less than two inches. However, for commercial or high-end aquariums, it is common to have a wide, flat edge that may be four inches or wider. Therefore, a longer hook and pad may be required.

Figure 8A:
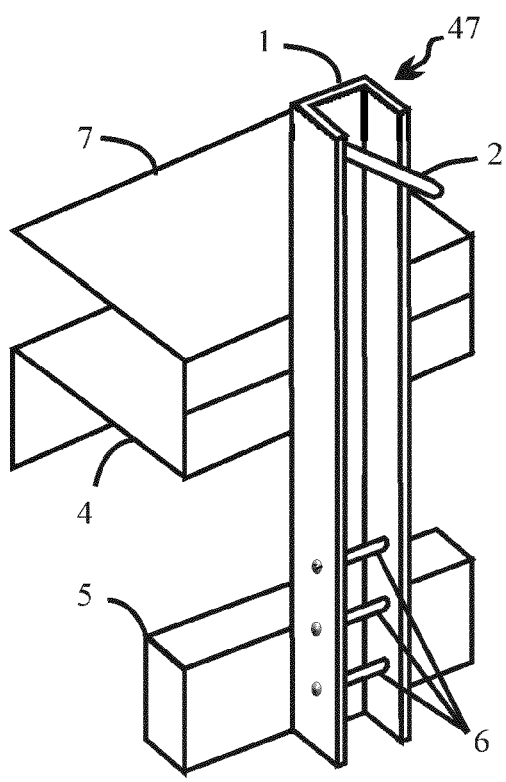
Figure 8B:
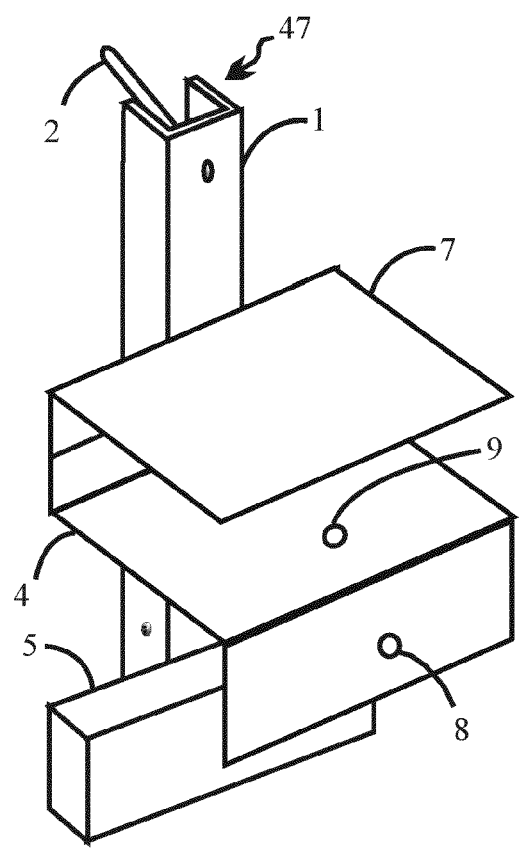

FIGS. 8a through 8g illustrate an exemplary aquarium frame 47 that may be used with both narrow-edge and wide-edge aquariums, in accordance with an embodiment of the present invention. FIG. 8a is a front perspective view, and FIG. 8b is a rear perspective view. FIG. 8c is a top view. FIG.

8d is a bottom view. FIG. 8e is a front view. FIG. 8f is a rear view, and FIG. 8g is a side view. In the present embodiment, aquarium frame 47 comprises a column 1, a dripping cup holder 2, a hook 4, a pad 5, and a plurality of rods 6, similarly to the embodiment shown by way of example in FIGS. 1a through 1g. Those skilled in the art, in light of the present teachings, will readily recognize that alternate embodiments may comprise various different features. For example, without limitation, alternate embodiments, may comprise different means for attaching a dripping cup such as, but not limited to, hooks, screws, etc. Alternate embodiments may also comprise different means for attaching a bag holder such as, but not limited to, screws, a sliding track, grooves, etc. Alternate embodiments may also comprise various different numbers, configurations and sizes of pads. A difference of the present embodiment with respect to the previous embodiment is in the addition of an upper extension 7. In addition, two holes are available for the adjustment of aquarium frame 47, a vertical adjustment hole 8 and a horizontal adjustment hole 9. An advantage of this design is its compactness, avoiding the use of excessive material in its construction.

Figure 9A:
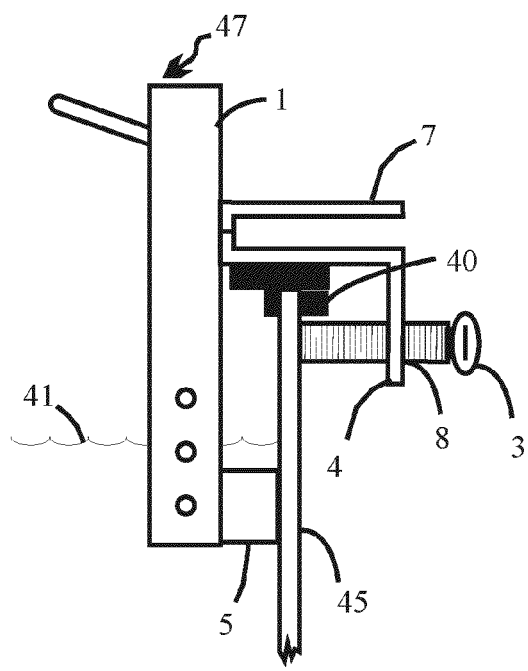
FIGS. 9a and 9b are side, cross sectional views illustrating how an aquarium frame may be attached to different types of aquariums.
Figure 9B:
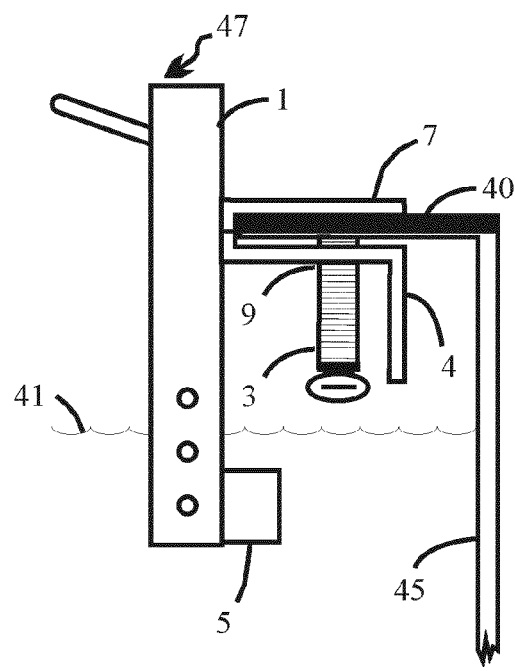

FIGS. 9a and 9b are side, cross sectional views illustrating how an aquarium frame 47 may be attached to different types of aquariums. FIG. 9a shows aquarium frame 47 attached to a narrow-edge aquarium, and FIG. 9b shows aquarium frame 47 attached to a wide-edge aquarium. Referring to FIG. 9a, a hook 4 is placed above an edge 40 of the aquarium, and a screw 3 is inserted to a vertical adjustment hole 8 located in hook 4. Screw 3 is tightened to make contact with a wall 45 on the outside of the aquarium, while a pad 5 remains in contact with wall 45 on the inside of the aquarium. In order to maintain contact with the wall, the pad in some embodiments may comprise a mechanism that enables the distance of the pad from the column to be adjusted. In alternate embodiments, the pad may be replaced by a suction cup. By adjusting screw 3 in the present embodiment, the inclination of column 1 may be changed. During the acclimation process, column 1 is to stay as vertical as possible.

Referring to FIG. 9b, upper extension 7 is placed above edge 40 of the aquarium with hook 4 under edge 40. Screw 3 is inserted into a horizontal adjustment hole 9 located in hook 4. Screw 3 is adjusted according to the thickness of edge 40. By adjusting screw 3 so that upper extension 7 is tightly pressed against edge 40, aquarium frame 47 generally remains vertical and can support a bag holder and a dripping cup. In an alternate embodiment a horizontal adjustment hole may be located in the upper extension rather than in the hook, and in yet another alternate embodiment a horizontal adjustment hole may be located in both the upper extension and the hook with two tightening screws being used.

Figure 10A:
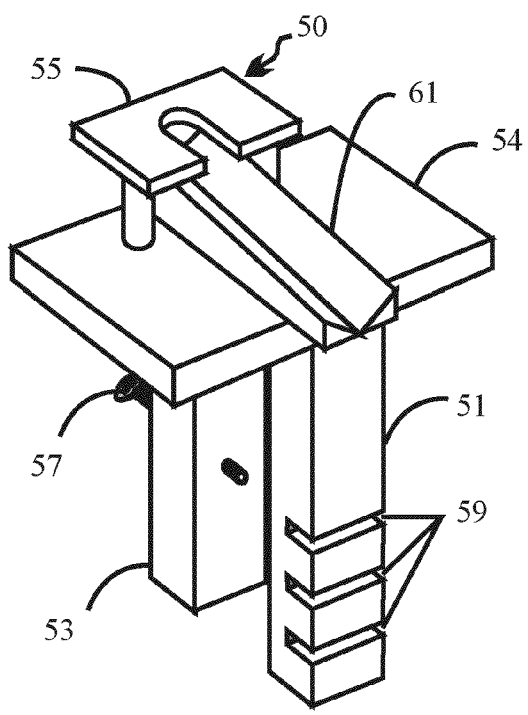
Figure 10B:
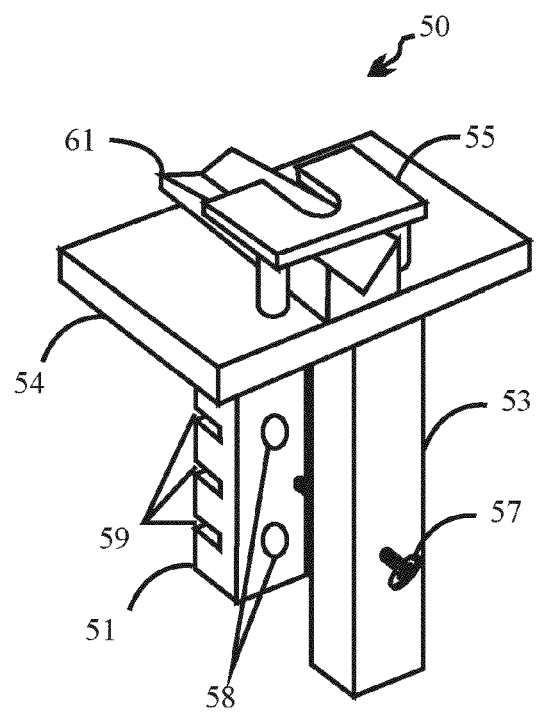

FIGS. 10a through 10g illustrate an exemplary aquarium frame 50 for an aquatic life acclimation system, in accordance with an embodiment of the present invention. FIG. 10a is a front perspective view, and FIG. 10b is a rear perspective view. FIG. 10c is a top view. FIG. 10d is a bottom view. FIG. 10e is a front view. FIG. 10f is a rear view, and FIG. 10g is a side view. In the present embodiment, aquarium frame 50 comprises a front column 51, a rear column 53, a main platform 54, a dripping cup platform 55, a tightening screw 57, pads 58, a plurality of grooves 59, and a trough 61. A dripping cup may be attached to dripping cup platform 55, and dripping cup platform 55 holds the dripping cup level with respect to columns 51 and 53 during the acclimation process. A bag holder can be placed at one of the positions given by grooves 59 in front of column 51. In alternate embodiments other means may be provided for attaching a bag holder to the front column such as, but not limited to, rods, holes for pegs, screws, a sliding track, etc. In the present embodiment, a plurality of grooves 59 is provided to enable the bag holder to be held in different positions, depending on the water level of the aquarium. Pads 58 remain in contact with the wall of the aquarium during the acclimation process and provide stability for aquarium frame 50. In alternate embodiments the aquarium frame may comprise more or fewer pads, and the pads may be various different shapes and sizes. In other alternate embodiments, suction cups may be used rather than pads. In the present embodiment, when a dripping cup is attached to dripping cup platform 55, trough 61 guides water from the dripping cup. Those skilled in the art, in light of the present teachings, will readily recognize that a trough may be used with other embodiments of aquarium frames such as, but not limited to, the embodiments previously described by way of example in FIGS. 1a through 1g and FIGS. 8a through 8g.

Figure 11:
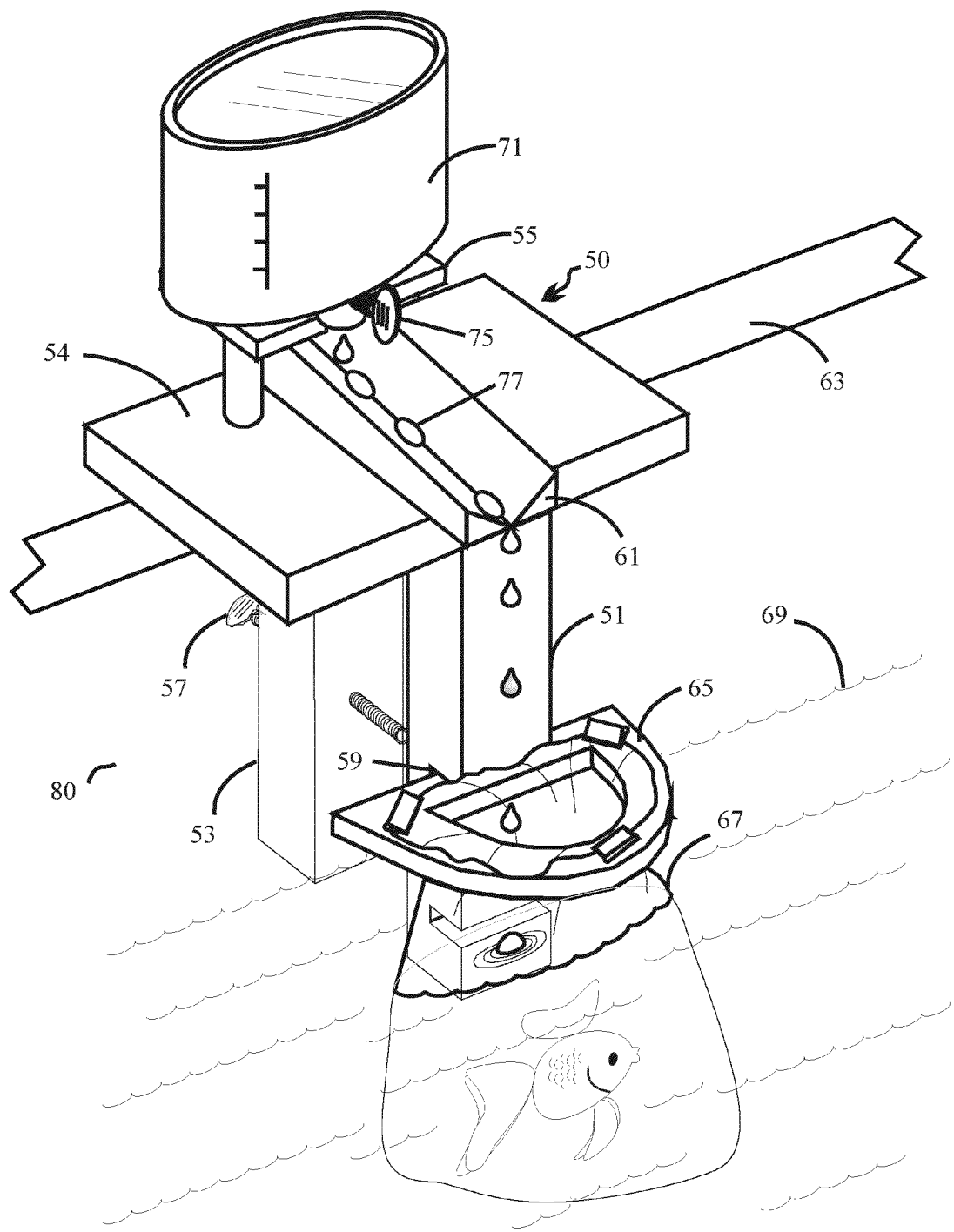
FIG. 11 illustrates an exemplary aquatic life acclimation system with an aquarium frame in use on an aquarium wall, in accordance with an embodiment of the present invention.

FIG. 11 illustrates an exemplary aquatic life acclimation system with an aquarium frame 50 in use on an aquarium edge 63, in accordance with an embodiment of the present invention. In the present embodiment, aquarium frame 50 is designed to be attached to edge 63 of an aquarium by placing a front column 51 on the inside of wall 80 and rear column 53 on the outside of wall 80. When aquarium frame 50 is attached to edge 63, adjusting screw 57 allows the position of frame 50 to change, where the main platform should stay level. A bag holder 65 with an attached plastic bag 67 containing a live specimen is placed in a groove 59 in front column 51 so that bag holder 65 is above the surface of aquarium water 69 or the highest water level while a portion of attached plastic bag 67 is partially submerged in water 69. A dripping cup 71 filled with water from the aquarium is placed on dripping cup platform 55. A valve handle 75 opens and closes a valve in dripping cup 71 that controls the rate of water coming from dripping cup 71. Water drops 77 dripping from dripping cup 71 fall into a trough 61, which guides water drops 77 directly into plastic bag 67 being held by bag holder 65.

In alternate embodiments of the present invention, aquarium frames may be attached to the wall of aquariums using only suction cups. In alternate embodiments, aquarium frames may be attached to the wall of aquariums using magnetic devices. In other alternate embodiments, the dripper cup and the bag holder may be separate elements of the acclimation apparatus. For example, without limitation, in one alternate embodiment, a bag holder may attach directly onto the edge of an aquarium using a hook while a dripper cup is attached to the aquarium next to and above the bag holder using an aquarium frame. In other alternate embodiments, the bag holder is permanently attached to the aquarium frame as a single unit.

Having fully described at least one embodiment of the present invention, other equivalent or alternative methods according to the present invention will be apparent to those skilled in the art. The invention has been described above by way of illustration, and the specific embodiments disclosed are not intended to limit the invention to the particular forms disclosed. For example, the particular implementation of the bag holder may vary depending upon the particular type of aquarium frame used. The bag holders described in the foregoing were directed to implementations that are separate from the aquarium frames; however, similar techniques are to incorporate the bag holder directly into the aquarium frame. Implementations of the present invention in which the bag holders are integrated into the aquarium frames are contemplated as within the scope of the present invention. The invention is thus to cover all modifications, equivalents, and alternatives falling within the spirit and scope of the following claims.

What is claimed is:

1. An apparatus for acclimating an aquatic organism contained in a partially water filled plastic bag to an environment in an aquarium, the apparatus comprising:
    an aquarium frame comprising a first portion capable of being exterior to the aquarium and a second portion capable of being interior to the aquarium;
    a bag holder operable to hold a top of the plastic bag in an open position, said bag holder positioned on said second portion and operable to hold the top of the plastic bag above a top level of water in the aquarium and a substantial portion of the plastic bag below the top level; and
    a dripping cup operable to release water obtained from the aquarium into the plastic bag, said dripping cup joinable to said first portion;
    wherein said second portion further comprises a plurality of pins upon which said bag holder can be positioned, and said bag holder further comprises a hook for engaging said pins.

2. The apparatus as recited in claim 1, wherein said first portion further comprises a dripping cup holder removably joined to said dripping cup.

3. The apparatus as recited in claim 1, wherein said bag holder further comprises a plurality of rods, said rods operable to maintain said partially water filled plastic bag in the open position when holes are punctured into said plastic bag.

4. The apparatus as recited in claim 1, wherein said bag holder further comprises clips for holding the top of the plastic bag in the open position.

5. The apparatus as recited in claim 1, wherein said first portion further comprises a hook for engaging the aquarium and tightening means for adjusting and securing the apparatus to the aquarium.

6. The apparatus as recited in claim 5, wherein said second portion further comprises pad means for contacting an interior surface of the aquarium to provide stability to the apparatus.

7. The apparatus as recited in claim 1, wherein said first portion further comprises an upper extension for joining to a wide top edge of the aquarium.

8. The apparatus as recited in claim 1, wherein said dripping cup further comprises a valve for initiating a flow of water into the bag and adjusting a rate of said flow.

* * * * *